(12) United States Patent
Takenaka et al.

(10) Patent No.: US 11,255,117 B2
(45) Date of Patent: Feb. 22, 2022

(54) CONTROL APPARATUS CONTROLLING OPENING AND CLOSING MEMBER FOR VEHICLE

(71) Applicant: AISIN SEIKI KABUSHIKI KAISHA, Kariya (JP)

(72) Inventors: Tomoyuki Takenaka, Kariya (JP); Kohei Kobayashi, Kariya (JP); Takashi Kaino, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 170 days.

(21) Appl. No.: 16/812,478

(22) Filed: Mar. 9, 2020

(65) Prior Publication Data

US 2020/0291705 A1 Sep. 17, 2020

(30) Foreign Application Priority Data

Mar. 12, 2019 (JP) ............................. JP2019-044823

(51) Int. Cl.
*E05F 15/40* (2015.01)
*E05F 15/662* (2015.01)
*H02P 27/08* (2006.01)
*H02P 6/15* (2016.01)
(Continued)

(52) U.S. Cl.
CPC ............ *E05F 15/40* (2015.01); *E05F 15/662* (2015.01); *H02P 6/153* (2016.02); *H02P 7/00* (2013.01); *H02P 27/08* (2013.01); *B60J 5/06* (2013.01); *E05Y 2201/41* (2013.01);
(Continued)

(58) Field of Classification Search
CPC .... H02P 6/153; H02P 6/20; H02P 6/28; H02P 6/32; H02P 7/00; H02P 7/04; H02P 6/08; H02P 7/245; H02P 7/2825; H02P 7/293; H02P 8/00; H02P 21/00; H02P 21/0003; H02P 21/22; H02P 23/00; H02P 23/0086; H02P 23/03; H02P 23/18; H02P 27/00; H02P 27/04; H02P 27/06; H02P 3/08;
(Continued)

(56) References Cited

U.S. PATENT DOCUMENTS 4,982,984 A * 1/1991 Yokota .................... E05B 81/22
292/201
6,051,945 A * 4/2000 Furukawa ............ H02H 7/0851
318/264

FOREIGN PATENT DOCUMENTS

JP 2015-168273 A 9/2015
JP 2019-2224 A 1/2019

* cited by examiner

*Primary Examiner* — Antony M Paul
(74) *Attorney, Agent, or Firm* — Oblon, McClelland, Maier & Neustadt, L.L.P.

(57) ABSTRACT

A control apparatus controlling an opening and closing member for a vehicle includes a drive control unit operating an opening and closing member of the vehicle by a motor serving as a drive source, and a catch detection unit detecting a catch of a foreign object caught by the opening and closing member in response to a current value of the motor. The drive control unit includes a motor control signal output unit outputting a motor control signal for supplying a drive power to the motor, and an advance-angle value setting unit setting an advance-angle value for advancing a phase of the motor control signal. The advance-angle value setting unit includes an advance-angle value increase prohibition unit prohibiting increase setting of the advance-angle value in a case where the current value of the motor reaches an advance-angle value increase prohibition current value.

2 Claims, 9 Drawing Sheets

(51) Int. Cl.
*H02P 7/00* (2016.01)
*B60J 5/06* (2006.01)
(52) U.S. Cl.
CPC ... *E05Y 2201/422* (2013.01); *E05Y 2201/434* (2013.01); *E05Y 2400/52* (2013.01); *E05Y 2900/531* (2013.01)
(58) Field of Classification Search
CPC .... H02P 6/24; H02P 8/08; H02P 9/009; H02P 3/06; H02P 6/06
See application file for complete search history.

CONTROL APPARATUS CONTROLLING OPENING AND CLOSING MEMBER FOR VEHICLE

CROSS REFERENCE TO RELATED APPLICATIONS

This application is based on and claims priority under 35 U.S.C. § 119 to Japanese Patent Application 2019-044823, filed on Mar. 12, 2019, the entire content of which is incorporated herein by reference.

TECHNICAL FIELD

This disclosure generally relates to a control apparatus controlling an opening and closing member for a vehicle.

BACKGROUND DISCUSSION

A known control apparatus controlling an opening and closing member for a vehicle is disclosed in JP2015-168273A (hereinafter referred to as Patent reference 1). According to the control apparatus controlling the opening and closing member for the vehicle disclosed in Patent reference 1, the opening and closing member of the vehicle, for example, a power sliding door apparatus, includes a drive source and opens and closes the opening and closing member by using a motor as the drive source. A known motor control apparatus operates an advance-angle control advancing a phase of a motor control signal outputted to a drive circuit of the motor.

A current phase of the motor may be delayed due to the increase of the rotational speed of the motor. Even in such a case, the motor control apparatus may control the motor efficiently by appropriately advancing the phase of the motor control signal outputted to the drive circuit to supply drive power to the motor. The relationship between motor torque (T) and rotational speed (N), so-called N-T characteristics or T-N characteristics, changes by the operation of the advance-angle control. Accordingly, for example, as a wiper control device disclosed in Patent reference 1, a control target controlled by the motor drive may move in high speed.

The relationship between the motor torque (T) and a motor current value (I), so-called I-T characteristics, also changes by the operation of the advance-angle control. In particular, the motor current value increases as an advance-angle value of the advance-angle control increases. Meanwhile, the known control device controlling the opening and closing member for the vehicle detects a catch of a foreign object caught by the opening and closing member based on or in response to the motor current value. In this case, misdetection of the catch of the foreign object may occur in a case where the motor current value significantly increases by the advance-angle control.

A need thus exists for a control apparatus controlling an opening and closing member for a vehicle which is not susceptible to the drawback mentioned above.

SUMMARY

According to an aspect of this disclosure, a control apparatus controlling an opening and closing member for a vehicle includes a drive control unit operating an opening and closing member of the vehicle by a motor serving as a drive source, and a catch detection unit detecting a catch of a foreign object caught by the opening and closing member in response to a current value of the motor. The drive control unit includes a motor control signal output unit outputting a motor control signal for supplying a drive power to the motor, and an advance-angle value setting unit setting an advance-angle value for advancing a phase of the motor control signal. The advance-angle value setting unit includes an advance-angle value increase prohibition unit prohibiting increase setting of the advance-angle value in a case where the current value of the motor reaches an advance-angle value increase prohibition current value.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
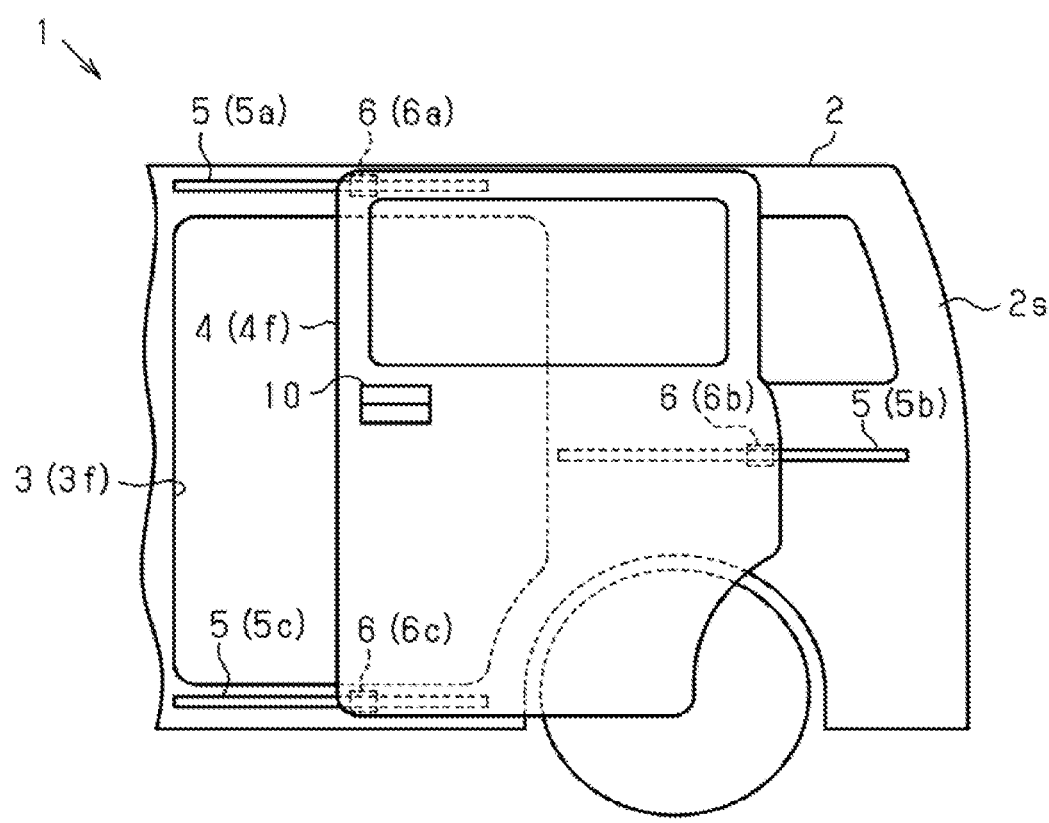
FIG. 1 is a side view of a vehicle including a sliding door according to an embodiment disclosed here.

An embodiment of a control apparatus controlling an opening and closing member for a vehicle will hereunder be explained. As illustrated in FIG. 1, a vehicle 1 of the embodiment includes a sliding door 4 opening and closing a door opening portion 3 provided at a side surface 2s of a body 2. In particular, the vehicle 1 includes plural guide rails 5 (5a to 5c) extending in the front-rear direction (the right-left direction in FIG. 1), and plural guide roller units 6 (6a to 6c) connected to the guide rails 5, respectively. That is, the sliding door 4 of the embodiment is supported by the side surface 2s of the body 2 via the guide rails 5 and the guide roller units 6. The guide rails 5 and the guide roller units 6 may move engagement positions of the guide roller units 6 relative to the guide rails 5 along the extending direction of the guide rails 5. The sliding door 4 of the embodiment moves in the vehicle front-rear direction in a state of being along the side surface 2s of the body 2.

That is, by moving frontwardly of the vehicle (left in FIG. 1), the sliding door 4 of the embodiment comes to be in a fully-closed state where the door opening portion 3 is closed, and by moving rearwardly of the vehicle (right in FIG. 1), the sliding door 4 comes to be in a fully-open state where a passenger of the vehicle 1 may get on and off the vehicle 1 via the door opening portion 3. The sliding door 4 is provided with a door handle 10 such as an outside door handle or an inside door handle, for opening and closing the sliding door 4.

Figure 2:
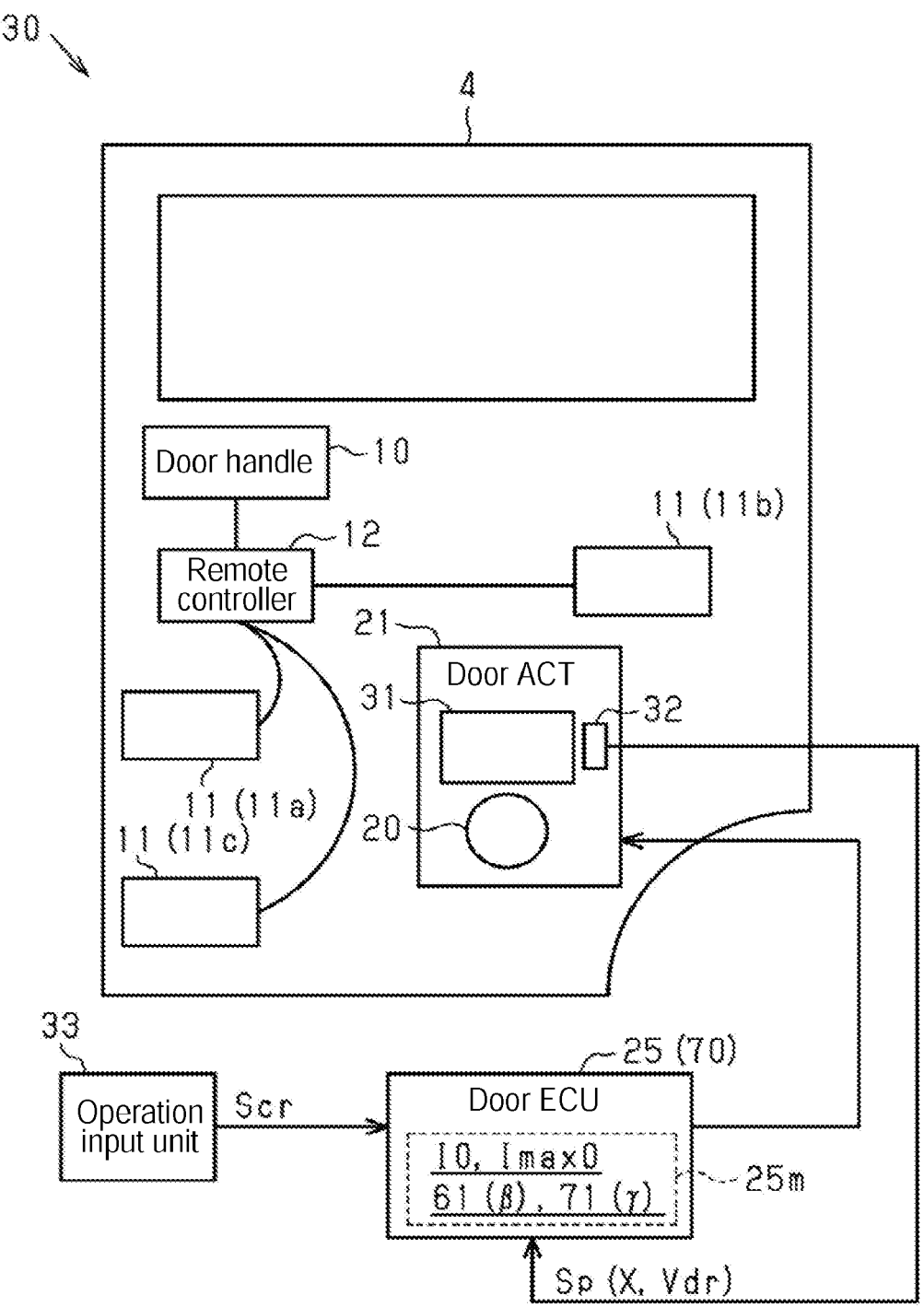
FIG. 2 is a schematic block diagram of a power sliding door apparatus.

As shown in FIG. 2, the sliding door 4 is provided with plural lock devices 11. The sliding door 4 includes a front lock 11a and a rear lock 11b both serving as a fully-closing lock restraining the sliding door 4 at a fully-closed position. The sliding door 4 is provided with a fully-open lock 11c for restraining the sliding door 4 at a fully-open position. According to the sliding door 4 of the embodiment, each of the lock devices 11 is connected to the door handle 10 via a remote controller 12.

That is, the sliding door 4 of the embodiment is released from the restrained state restrained by the lock device 11 when the door handle 10 is operated. The sliding door 4 may be released from the restrained state restrained by the lock device 11 when the passenger who operates remotely by operating an operation switch provided at a vehicle compartment or, for example, a mobile device. The sliding door 4 may be open and closed manually by the door handle 10 which serves as a grip portion.

Figure 3:
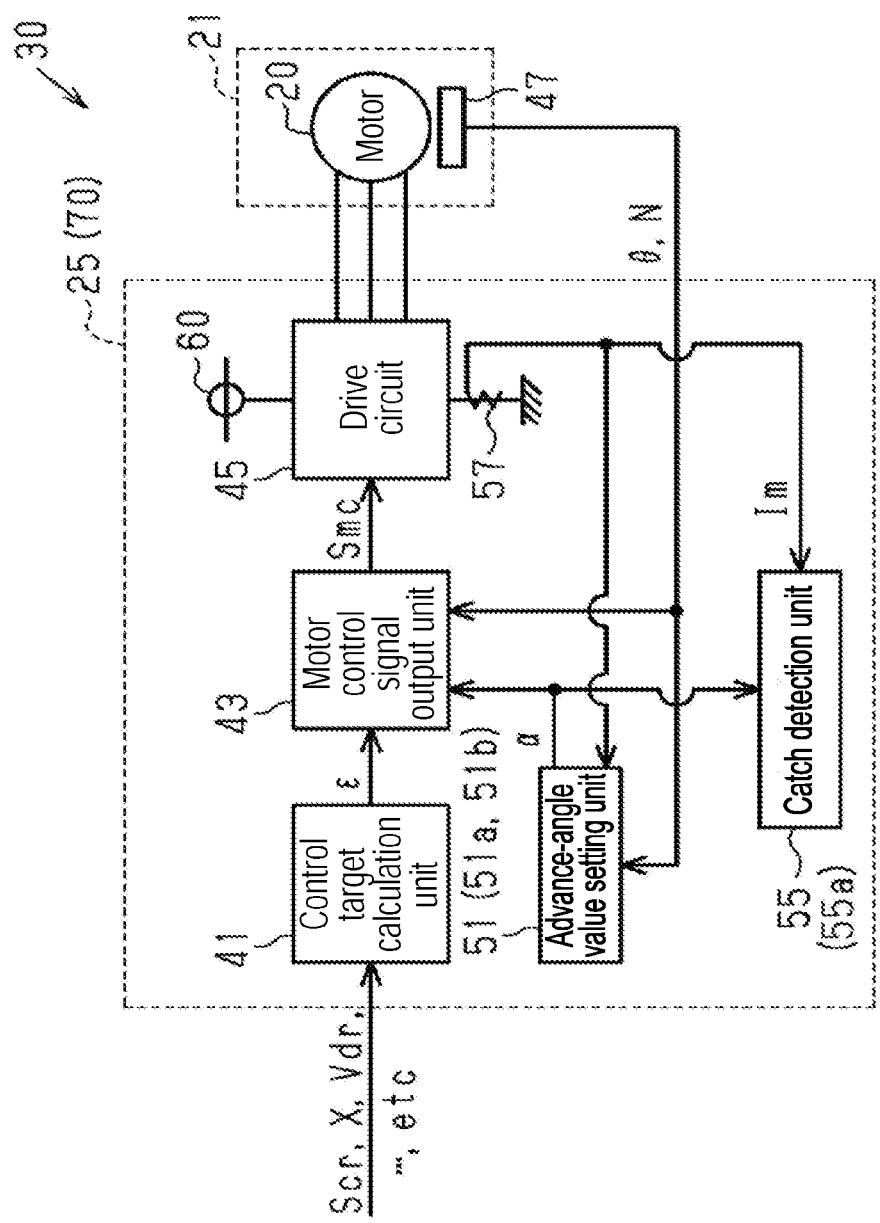
FIG. 3 is a control block diagram of the power sliding door apparatus.

The sliding door 4 of the embodiment includes a door actuator 21 using the motor 20 as a drive source. The motor 20 of the door actuator 21 rotates by receiving the supply of the drive power from a door ECU 25. That is, the door ECU 25 controls the operation of the door actuator 21 through the supply of the drive power to the motor 20. As shown in FIG. 3, the vehicle 1 of the embodiment includes a power sliding door apparatus 30 serving as a control apparatus controlling an opening and closing member for a vehicle which may open and close the sliding door 4 based on or in response to drive power of the motor 20.

In particular, as shown in FIG. 2, the door actuator 21 of the embodiment includes an opening and closing drive unit 31 opening and closing the sliding door 4 via a drive cable based on or in response to the drive power of the motor 20.

The door actuator 21 of the embodiment includes a pulse sensor 32 outputting a pulse signal Sp synchronized with the operation of the opening and closing drive unit 31. The door ECU 25 of the embodiment detects a moving position X and a moving speed Vdr of the sliding door 4 driven by the door actuator 21 based on pulse output of the pulse sensor 32.

The door ECU 25 of the embodiment is inputted with an output signal (an operation input signal Scr) of an operation input unit 33 provided at, for example, the door handle 10, the vehicle compartment, or the mobile device. That is, the door ECU 25 of the embodiment detects, in response to or based on an operation input signal Scr, operation requests for the sliding door 4 required by a user. The door ECU 25 controls the operation of the door actuator 21 in order to move the sliding door 4 in a required operation direction.

More specifically, as illustrated in FIG. 3, the door ECU 25 of the embodiment includes a control target calculation unit 41 calculating a control target ε of the motor 20 serving as the drive source so as to open and close the sliding door 4. The door ECU 25 includes a motor control signal output unit 43 outputting the motor control signal Smc based on the control target ε. The door ECU 25 includes a drive circuit 45 outputting the drive power to the motor 20 in response to the motor control signal Smc. The door ECU 25 controls the operation of the door actuator 21 by the drive power supplied to the motor 20.

In particular, the control target calculation unit 41 of the embodiment calculates the control target ε of the motor 20 based on a vehicle state amount of any kinds, for example, an operation input signal Scr indicating operation requests of the user, the moving position X and the moving speed Vdr of the sliding door 4, or vehicle speed. According to the door ECU 25 of the embodiment, the control target ε outputted by the control target calculation unit 41 indicates the rotational direction and a duty (on-duty ratio) of the motor 20. The motor 20 of the embodiment employs a blushless motor, and the motor control signal output unit 43 is inputted with a rotational angle (an electric angle) θ of the motor 20 detected by the rotational angle sensor 47. The motor control signal output unit 43 of the embodiment outputs the motor control signal Smc having a phase which changes in response to the rotational angle θ of the motor 20.

That is, the drive circuit 45 of the embodiment employs an appropriate pulse width modulation inverter or a PWM inverter which is formed by plural switching elements connected with one another in a bridge-like manner. The motor control signal Smc outputted by the motor control signal output unit 43 corresponds to a PWM control signal defining a timing to turn on and off the switching elements of the drive circuit 45, the timing corresponding to the on-duty ratio indicated by the control target ε outputted by the control target calculation unit 41, in addition to an on-off combination in response to the rotational angle θ of the motor 20. Accordingly, the door ECU 25 of the embodiment outputs three-phase (U, V, VV) drive power to the motor 20 via the drive circuit 45.

The door ECU 25 of the embodiment includes an advance-angle value setting unit 51 setting an advance-angle value α for advancing the phase of the motor control signal Smc. That is, the motor control signal output unit 43 of the embodiment is inputted with the advance-angle value α outputted by the advance-angle value setting unit 51 together with the rotational angle θ of the motor 20. Accordingly, the door ECU 25 of the embodiment supplies the drive power relative to the motor 20 by the motor control signal Smc outputted by the motor control signal output unit 43, the motor control signal Smc of which phase is advanced by the advance-angle value α. That is, the door ECU 25 may operate any advance-angle control.

Figure 4:
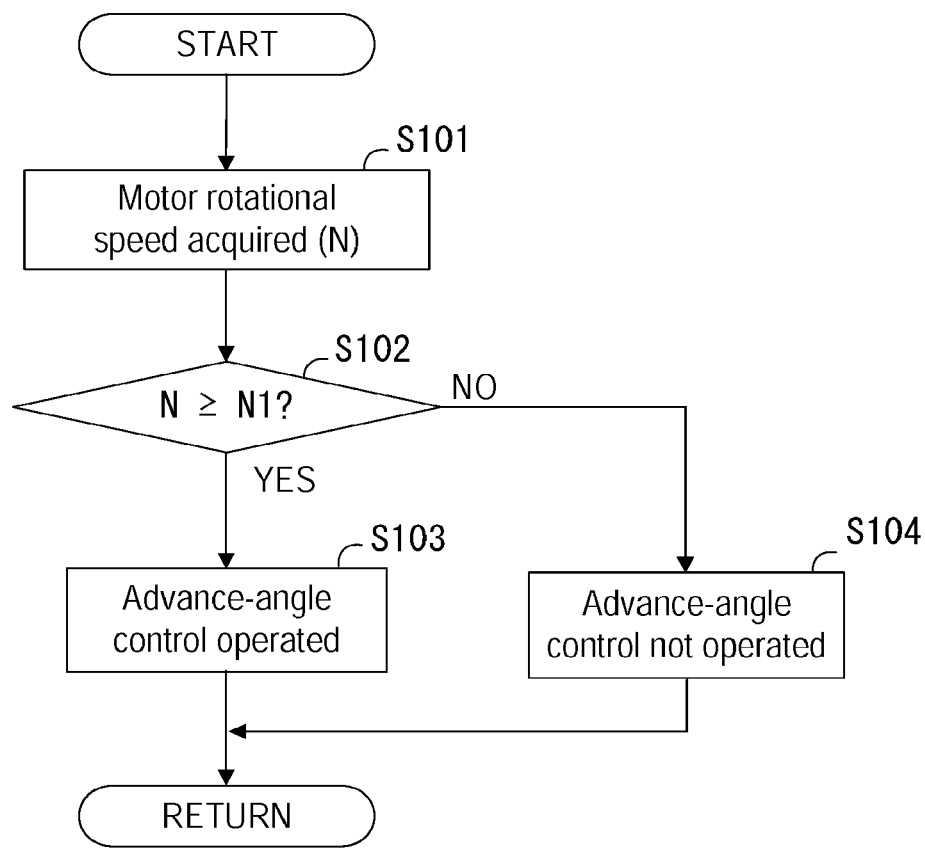
FIG. 4 is a flowchart illustrating a mode of an advance-angle control.

Specifically, as illustrated in a flowchart in FIG. 4, the door ECU 25 of the embodiment acquires a rotational speed N (for example, rotational speed per minute) of the motor 20 in Step S101, and determines whether the rotational speed N is equal to or greater than a predetermined speed N1 in Step S102. In a case where the rotational speed N of the motor 20 is equal to or greater than the predetermined speed N1, the door ECU 25 operates the advance-angle control in Step S103, and in a case where the rotational speed N is lower than the predetermined speed N1, the door ECU 25 does not operate the advance-angle control in Step S104.

Figure 5:
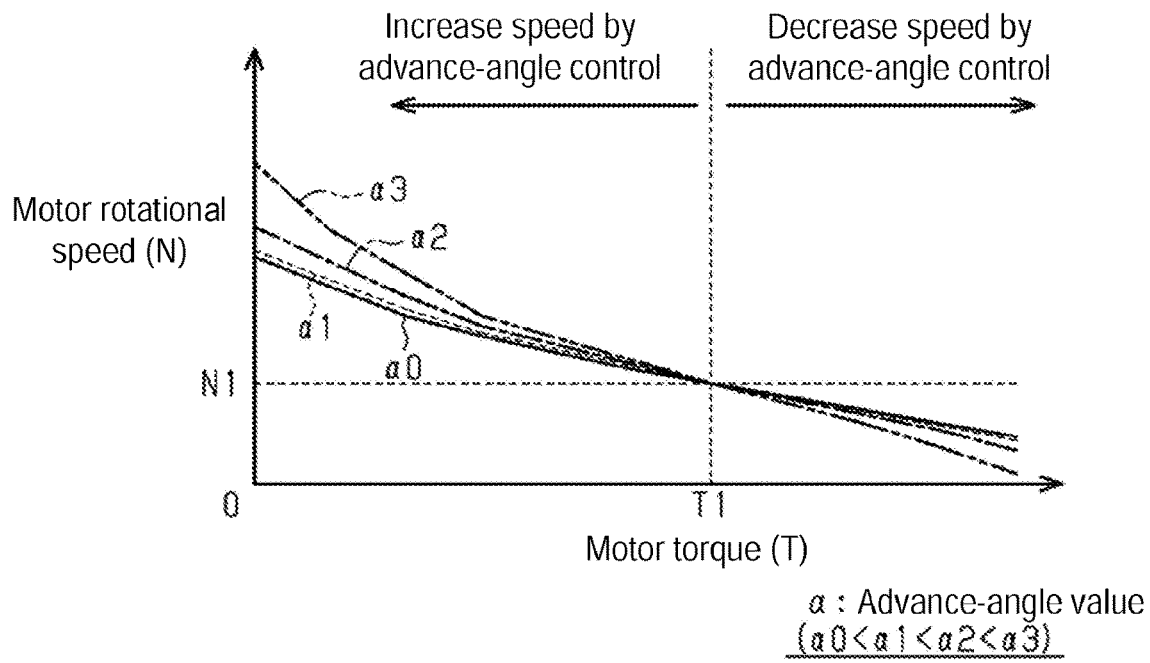
FIG. 5 is a graph illustrating N-T characteristics of a motor changed by the advance-angle control, and a relationship between the N-T characteristics and an advance-angle value.

That is, as illustrated in FIG. 5, N-T characteristics or T-N characteristics indicating the relationship between the motor torque T and the rotational speed N changes into a high rotational speed, a low torque mode by the operation of the advance-angle control. Considering this point, as shown in FIG. 5, according to the power sliding door apparatus 30 of the embodiment, the relationship between the rotational speed N and the motor torque T is required, by having, for example, a predetermined simulation, such that the rotational speed N of the motor 20 increases in response to the operation of the advance-angle control. The door ECU 25 of the embodiment sets a lower limit value of the rotational speed N that increases the speed of the motor 20 by operating the advance-angle control as the predetermined speed N1. That is, the door ECU 25 of the embodiment operates the advance-angle control only at a low load region where the motor 20 rotates while including additional power to increase the rotational speed N by the advance-angle control.

A dotted wave form shown in FIG. 5 illustrates the N-T characteristics of the motor 20 in a case where the advance-angle value α of the advance-angle control corresponds to α1. A single-dotted chain wave form shown in FIG. 5 illustrates the N-T characteristics of the motor 20 in a case where the advance-angle value α of the advance-angle control corresponds to α2. A double-dotted chain wave form shown in FIG. 5 illustrates the N-T characteristics of the motor 20 in a case where the advance-angle value α of the advance-angle control corresponds to α3. In FIG. 5, a solid-lined wave form shows the N-T characteristics of the motor 20 in a case where the advance-angle value α of the advance-angle control corresponds to α0=0°, that is, the advance-angle control is not operated. The advance-angle values α0 to α3 each shown with the wave forms are set greater value as the number increases (α0<α1<α2<α3). That is, the speed-up action of the motor 20 by the operation of the advance-angle control comes to be more significant as the advance-angle value α increases.

Considering this point, according to the door ECU 25 of the embodiment, the advance-angle setting unit 51 basically sets greater advance-angle value α as the rotational speed N of the motor 20 increases. According to the door ECU 25 of the embodiment, the phase of the motor control signal Smc is advanced by the advance-angle value α which basically corresponds to the rotational speed N of the motor 20 when the advance-angle control is operated.

As shown in FIG. 3, the door ECU 25 of the embodiment includes a catch detection unit 55 detecting the catch of the foreign object occurred at the sliding door 4 in a case where the foreign object, for example, hand and foot of the passenger, is caught between a front end unit 4f of the sliding door 4 and a front end unit 3f of the door opening portion 3 (see FIG. 1). Specifically, according to the door ECU 25 of the embodiment, a current value of a current flowing in the drive circuit 45 from a vehicle-mounted power 60, the current detected by the current sensor 57, that is, a current value Im of the motor 20, is inputted to the catch detection unit 55. The catch detection unit 55 of the embodiment detects the catch based on the current value Im of the motor 20.

Figure 6:
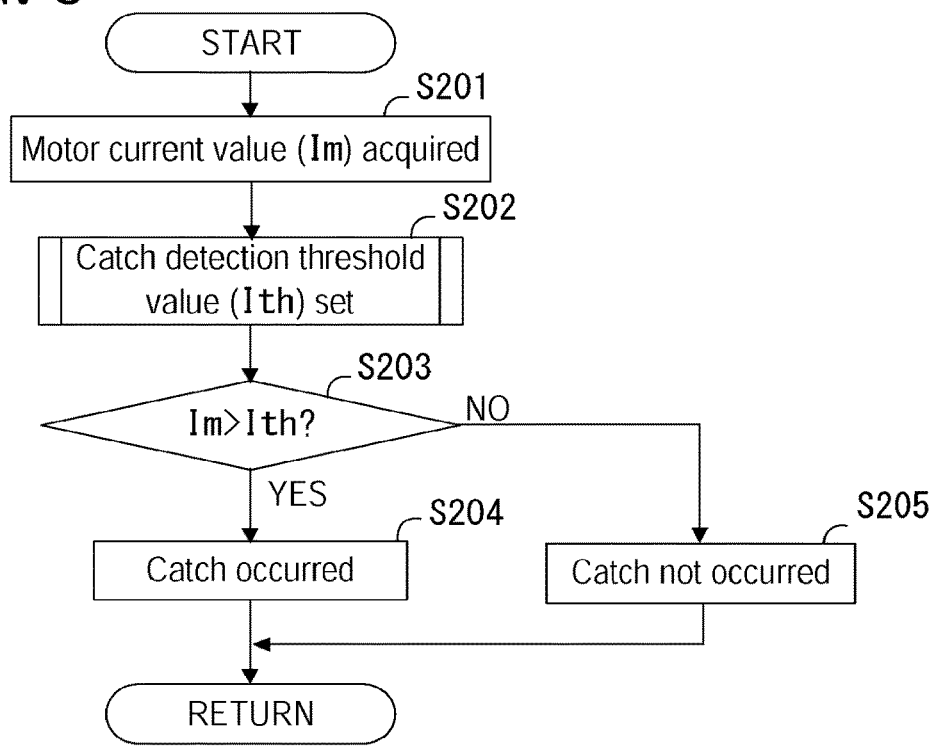
FIG. 6 is a flowchart illustrating an operation procedure of a detection of a catch of a foreign object.

Specifically, as shown in a flowchart in FIG. 6, in a case where the current value Im of the motor 20 is acquired in Step S201, the catch detection unit 55 of the embodiment sets a catch detection threshold value Ith used for detecting the catch of the foreign object in Step S202. The catch detection unit 55 compares the catch detection threshold value Ith with the current value Im of the motor 20 in Step S203, and in a case where the current value Im is greater than the catch detection threshold value Ith (Im>Ith, Step S203: YES), the catch detection unit 55 determines that the sliding door 4 catches the foreign object in Step S204. In a case where the current value Im of the motor 20 is equal to or lower than the catch detection threshold value Ith (Im≤Ith, Step S203: NO), the catch detection unit 55 determines that the sliding door 4 does not catch the foreign object in Step S205.

That is, by the stop of the rotation of the motor 20 due to the catch of the foreign object, the current value Im of the motor 20 increases as a locked rotor current. The catch detection unit 55 of the embodiment monitors the change of the current occurred to the motor 20 to detect the catch of the foreign object occurred to the sliding door 4.

As shown in FIG. 3, the catch detection unit 55 of the embodiment includes a catch detection threshold value correction unit 55a correcting the catch detection threshold value Ith to increase as the advance-angle value α increases. Specifically, as shown in a flowchart in FIG. 7, the catch detection unit 55 reads out a reference value I0 from a storage region 25m of the door ECU 25 (see FIG. 2) in Step S301 when setting the catch detection threshold value Ith for the detection of the catch of the foreign object (see FIG. 6, Step S202), and determines whether the advance-angle control is being operated in Step S302. In a case where the advance-angle control is operated (Step S302: YES), the catch detection unit 55 sets the catch detection threshold value Ith (Steps S303 to S305) which is greater than a case where the advance-angle control is not operated (Step S302: NO).

Figure 9:
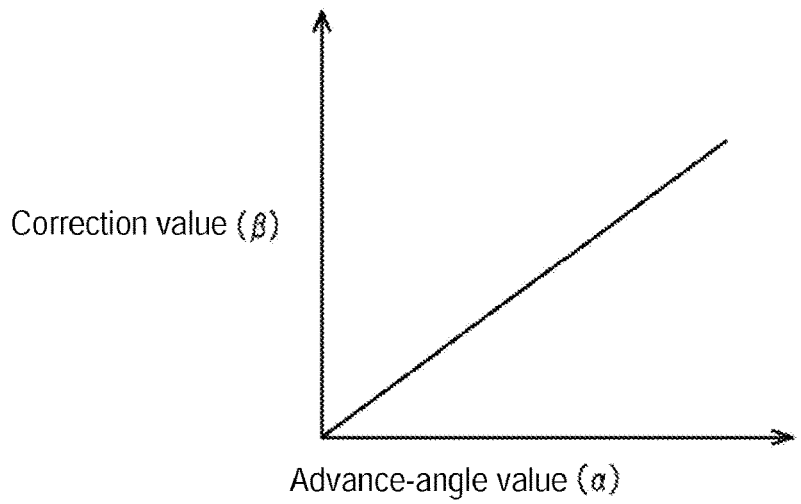
FIG. 9 is an explanatory view of a correction map used for changing a determination condition of the catch of the foreign object.

In particular, as shown in FIGS. 2 and 9, the door ECU 25 of the embodiment stores, in the storage region 25m, a correction map 61 for correcting the catch detection threshold value Ith used for detecting the catch of the foreign object. Specifically, in the door ECU 25 of the embodiment, the correction map 61 defines the relationship between the advance-angle value α and the correction value β when the advance-angle control is operated. In the correction map 61 of the embodiment, the larger correction value β is calculated as the advance-angle value α set by the advance-angle control being operated increases.

Figure 7:
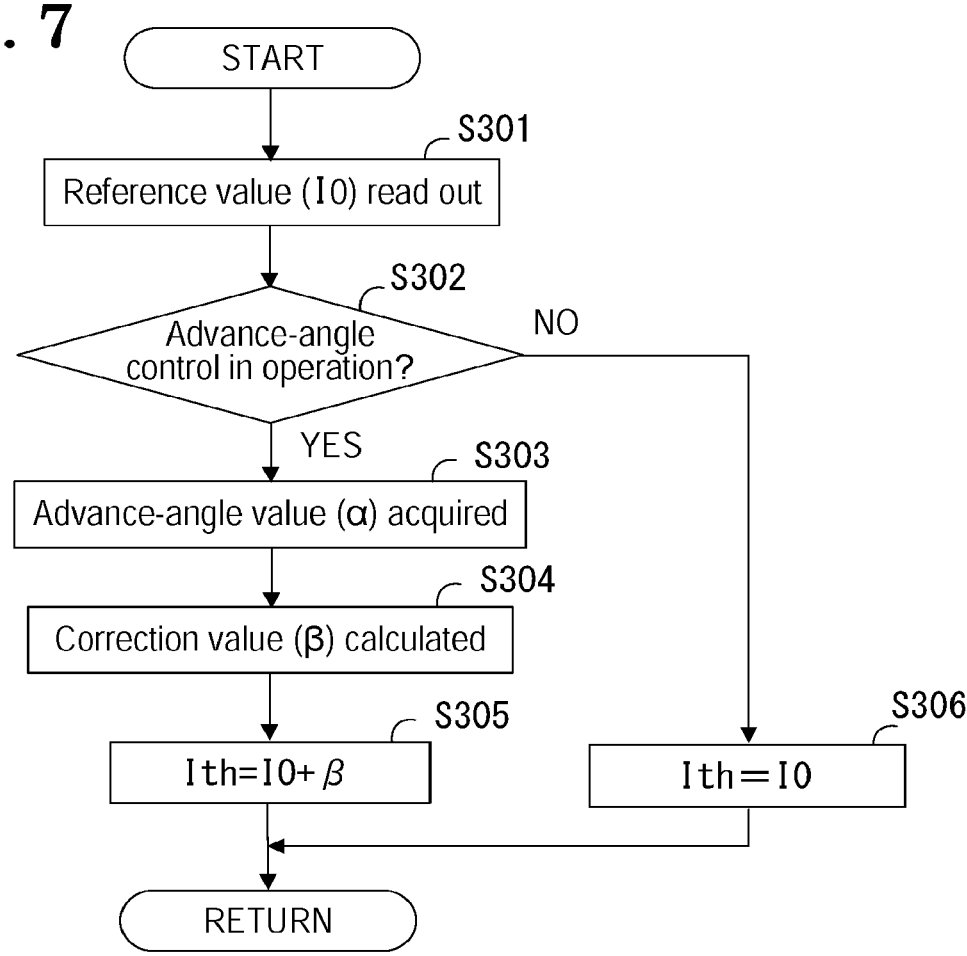
FIG. 7 is a flowchart illustrating an operation procedure changing a detection condition of the catch when the advance-angle control is operated.

That is, as shown in a flowchart in FIG. 7, the catch detection unit 55 of the embodiment acquires the advance-angle value α of the advance-angle control in Step S303 when the advance-angle control is operated (Step S302: YES). The catch detection unit 55 calculates the correction value β which corresponds to or is in accordance with the advance-angle value α in Step S304 by using the correction map 61. The catch detection unit 55 of the embodiment sets a value which is a summed value of the correction value β and the reference value I0 in Step S305 as the catch detection threshold value Ith used for detecting the catch of foreign object.

Meanwhile, in a case where the advance-angle control is not operated (Step S302: NO), the catch detection unit 55 sets the reference value I0 which is read out in Step S306 as the catch detection threshold value Ith. The catch detection unit 55 of the embodiment changes the determination condition when the advance-angle control is operated so that it is difficult for the catch detection unit 55 to determine, or the catch detection unit 55 does not easily determine, that the sliding door 4 catches the foreign object comparing to a case where the advance-angle control is not operated.

Figure 8:
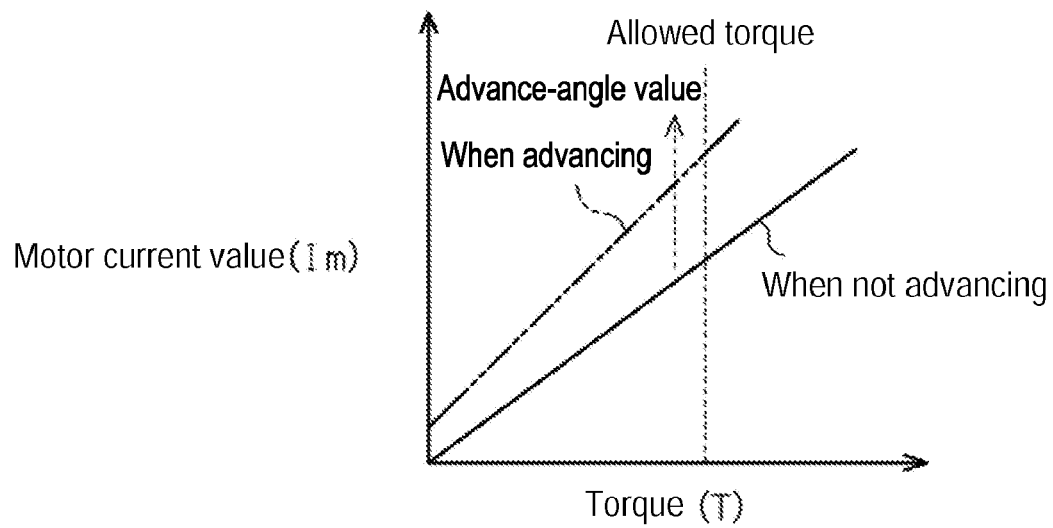
FIG. 8 is a graph illustrating I-T characteristics of a motor, the I-T characteristics changed by the advance-angle control.

That is, as shown in FIG. 8, because the I-T characteristics of the motor 20 changes by the advance-angle control, the current value Im increases, the current value Im required to generate the same amount of the motor torque T, for example an allowable torque. The current value Im required to generate the same amount of the motor torque T significantly increases as the advance-angle value increases. Considering this point, the catch detection unit 55 of the embodiment previously changes the determination condition of the catch detection so that it is difficult for the catch detection unit 55 to determine, or the catch detection unit 55 is not easily determine, that the sliding door 4 catches the foreign object. Accordingly, the misdetermination is prevented from being occurred by not making the current value Im exceed the catch detection threshold value Ith of the motor 20 despite that the catch of the foreign object does not occur.

As mentioned above, in the door ECU 25 of the embodiment, the phase of the motor control signal Smc is advanced by the advance-angle value α set by the advance-angle value setting unit 51 when the advance-angle control is operated. The advance-angle value α is basically set greater as the rotational speed N of the motor 20 increases. However, the advance-angle value setting unit 51 is configured to increase or decrease the advance-angle value α gradually. As illustrated in FIG. 3, the advance-angle value setting unit 51 includes an advance-angle value increase prohibition unit 51a which prohibits the increase setting of the advance-angle value α when or in a case where the current value Im reaches the advance-angle value increase prohibition current value Imax. In particular, according to the door ECU 25 of the embodiment, the current value Im of the motor 20 is inputted to the advance-angle value setting unit 51, and according to the advance-angle value setting unit 51 of the embodiment, when or in a case where the current value Im reaches the advance-angle value increase prohibition current value Imax, the increase setting of the advance-angle value α is prohibited by the advance-angle value increase prohibition unit 51a.

Figure 10:
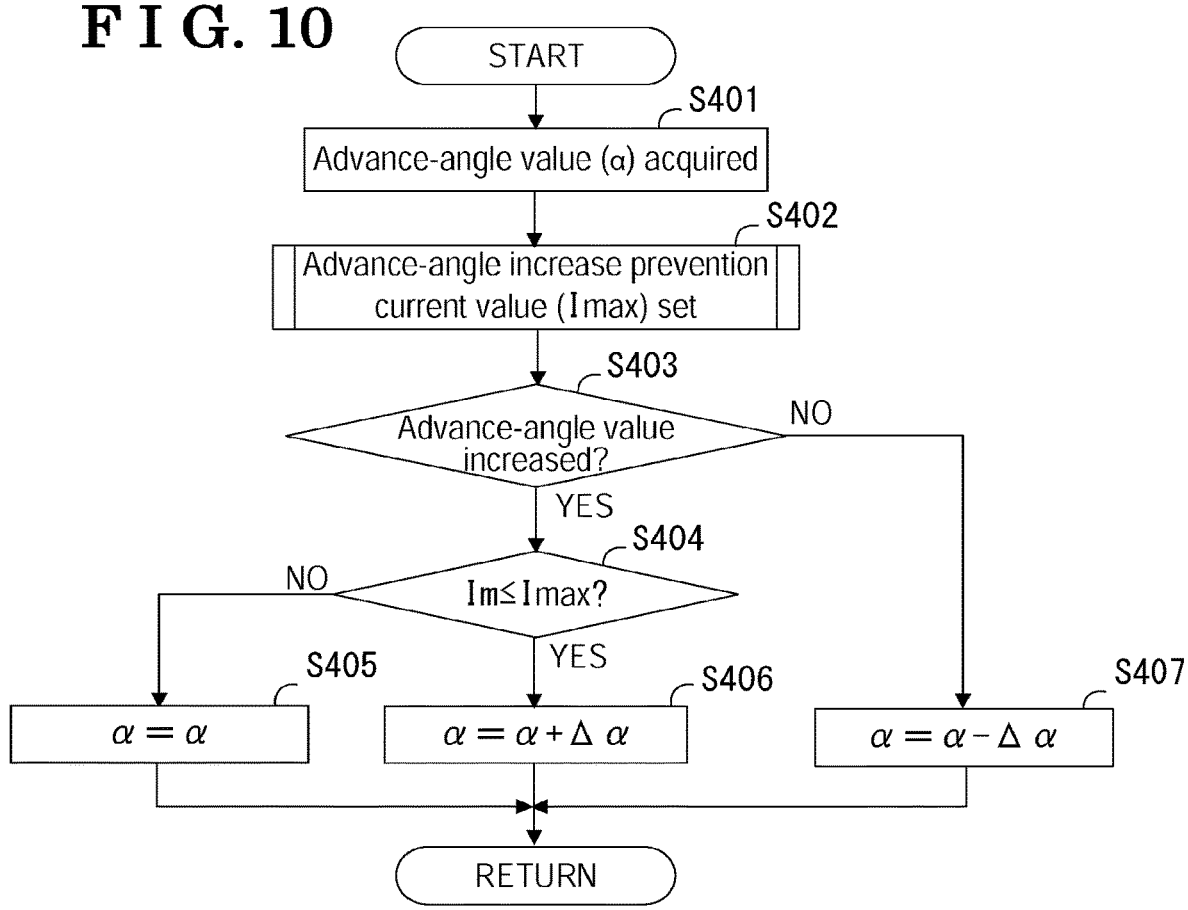
FIG. 10 is a flowchart illustrating a mode of the advance-angle value setting.

Specifically, as shown in a flowchart in FIG. 10, the advance-angle value setting unit 51 of the embodiment sets the advance-angle value increase prohibition current value Imax in Step S402 by acquiring the current advance-angle value α in Step 401. In case of increasing the advance-angle value α (Step S403: YES), the advance-angle value setting unit 51 compares the advance-angle value increase prohibition current value Imax with the current value Im of the motor 20 in Step S404. The advance-angle value setting unit 51 sets the present (or current) advance-angle value α as the advance-angle value α in Step S405 in a case where the current value Im exceeds the advance-angle value increase prohibition current value Imax (Step S404: NO). In a case where the current value Im is equal to or less than the advance-angle value increase prohibition current value Imax (Step S404: YES), the advance-angle value setting unit 51 sets a value as a new advance-angle value α, the value which is the summation of a small predetermined value Δα and the current advance-angle value α so as to increase or operate the increase setting of the advance-angle value α in Step S406.

On the other hand, for decreasing the advance-angle value α (Step S403: NO), the advance-angle value setting unit 51 sets a value as a new advance-angle value α, the value in which the predetermined value Δα is subtracted from the current advance-angle value α to increase or operate the increase setting of the advance-angle value α in Step S407.

As such, even for increasing the advance-angle value α, the advance-angle value setting unit 51 prohibits the increase setting of the advance-angle value α in a case where the current value Im exceeds the advance-angle value increase prohibition current value Imax. This is because, as shown in FIG. 8, the relationship between the motor torque (T) and the motor current value (I), that is, the so-called I-T characteristics changes by the operation of the advance-angle control. In particular, comparing to the normal control when the advance-angle control is not operated, the current value Im increases and the increasing amount increases in accordance with the increase of the advance-angle value α when the advance-angle control is operated. In a case where the relatively-large advance-angle value α is set and the current value Im prominently or significantly increases, the current value Im comes close to the catch detection threshold value Ith so that the possibility of the misdetection of the catch becomes high. Considering this point, the advance-angle value setting unit 51 of the embodiment prohibits the increase setting of the advance-angle value α in a case where the current value Im exceeds the advance-angle value increase prohibition current value Imax.

Figure 11A:
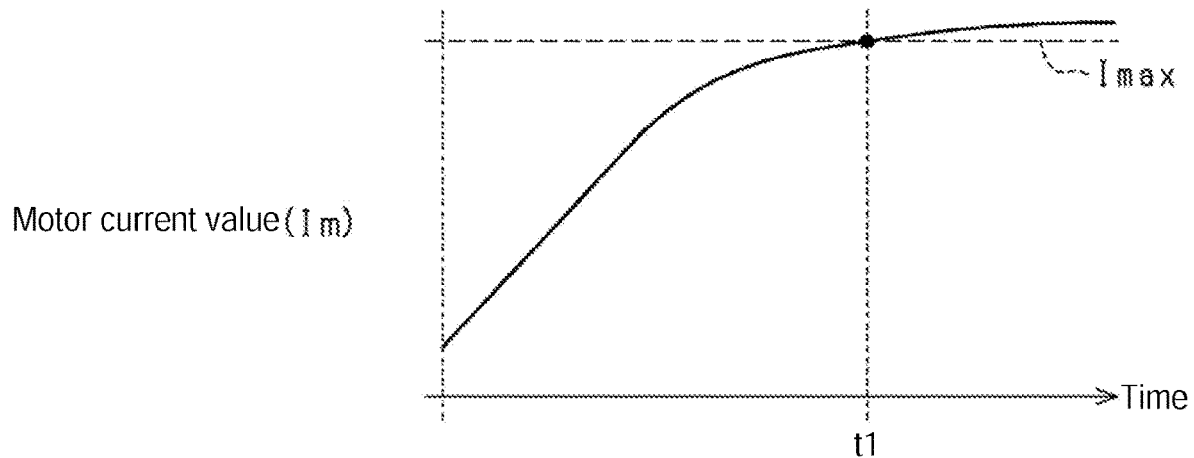
FIG. 11A is a time chart illustrating a transition of the motor current value when the advance-angle value increases by the advance-angle control.
Figure 11B:
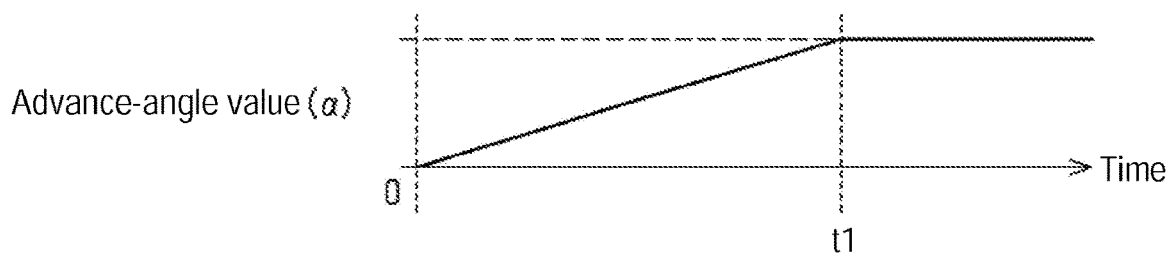
FIG. 11B is a time chart illustrating a transition of the advance-angle value when the advance-angle value increases by the advance-angle control.

As shown in examples in FIGS. 11A and 11B, in a case where the current value Im exceeds the advance-angle value increase prohibition current value Imax at a time t1 during the increase of the advance-angle value α by the advance-angle control, the further increase of the advance-angle value α is prohibited. Accordingly, the increase of the current value Im is inhibited, and it is confirmed that the current value Im does not largely exceed the advance-angle value increase prohibition current value Imax.

Figure 12:
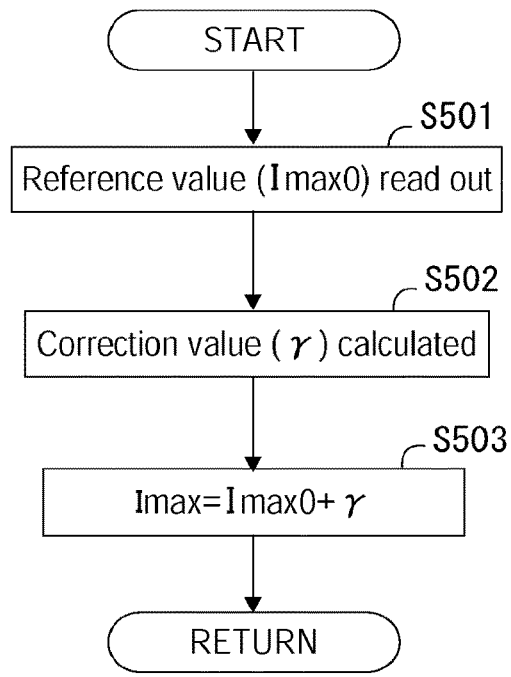
FIG. 12 is a flowchart illustrating a mode of correction of an advance-angle value increase prohibition current value.

As shown in a flowchart in FIG. 12, for setting the advance-angle value increase prohibition current value Imax (see FIG. 10, Step S402), the advance-angle value setting unit 51 reads out the reference value Imax0 from the storage region 25m of the door ECU 25 in Step S501, and calculates a correction value γ which corresponds to or is in accordance with the advance-angle value α in Step S502. The advance-angle value setting unit 51 sets a value which is the summation of the correction value γ and the reference value Imax0 in Step S503 as the advance-angle value increase prohibition current value Imax.

Figure 13:
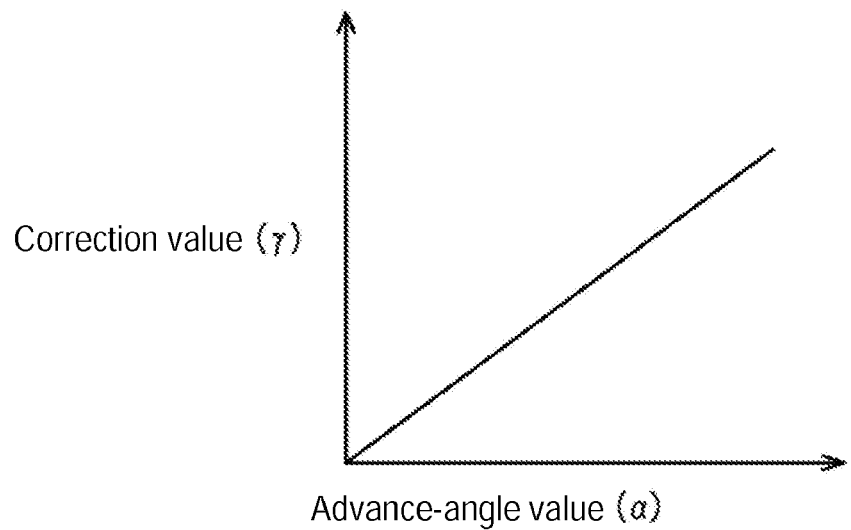
FIG. 13 is an explanatory view of a correction map used for correcting the advance-angle value increase prohibition current value.

Specifically, as shown in FIGS. 2 and 13, in the door ECU 25 of the embodiment, a correction map 71 for correcting the advance-angle value increase prohibition current value Imax is stored in the storage region 25m. In particular, in the door ECU 25 of the embodiment, the correction map 71 defines the relationship between the advance-angle value α and the correction value γ of the advance-angle control being operated. In the correction map 71 of the embodiment, the larger correction value γ is calculated as the advance-angle value α specified in the advance-angle control being operated increases. An advance-angle value increase prohibition current value correction unit 51b of the advance-angle value setting unit 51 shown in FIG. 3 corrects the advance-angle value increase prohibition current value Imax so as to follow the catch detection threshold value Ith corrected so as to increase as the advance-angle value α increases.

According to the aforementioned embodiment, the effects and advantages may be attained.

According to the embodiment, the door ECU 25 includes the catch detection unit 55 which detects the catch of the foreign objects by the sliding door 4 serving as the opening and closing member provided at the opening unit 3 of the vehicle 1 in response to or based on the current value Im of the motor 20 serving as the drive source. The door ECU 25 serving as a drive control unit 70 includes the motor control signal output unit 43 and the advance-angle value setting unit 51. The motor control signal output unit 43 outputs the motor control signal Smc for supplying the drive power to the motor 20. The advance-angle value setting unit 51 specifies the advance-angle value α for advancing the phase of the motor control signal Smc. The advance-angle value setting unit 51 includes the advance-angle value increase prohibition unit 51a that prohibits the increase setting of the advance-angle value α when or in a case where the current value Im of the motor 20 reaches the advance-angle value increase prohibition current value Imax.

According to the aforementioned embodiment, in a case where the current value Im of the motor 20, the current value Im increasing in accordance with the increase of the advance-angle value α, reaches the advance-angle value increase prohibition current value Imax when the advance-angle control is operated, the advance-angle value increase prohibition unit 51a of the advance-angle value setting unit 51 prohibits the increase setting of the advance-angle value α. Accordingly, the advance-angle value α does not increase further, and the current value Im of the motor 20 does not increase to significantly exceed the advance-angle value increase prohibition current value Imax. Thus, the catch detection unit 55 is inhibited from detecting the catch of the foreign object mistakenly in response to or based on the current value Im of the motor 20.

According to the aforementioned embodiment, the catch detection unit 55 detects the catch of the foreign object by the sliding door 4 in response to the magnitude correlation between the current value Im and the catch detection threshold value Ith of the motor 20. The catch detection unit 55 includes the catch detection threshold correction unit 55a correcting the advance-angle value increase prohibition current value Imax so as to increase as the advance-angle value α increases. The advance-angle value setting unit 51 includes the advance-angle value increase prohibition current value correction unit 51b which corrects the advance-angle value increase prohibition current value Imax so as to increase as the advance-angle value α increases.

It is confirmed that, in a case where the allowable torque for detecting the catch of the foreign object by the sliding door 4 is the same, the current value Im of the motor 20 in response to the allowable torque increases as the advance-angle value α increases. According to the aforementioned configuration, the advance-angle value increase prohibition unit 51a corrects the catch detection threshold value Ith so as to increase as the advance-angle value α increases so that the catch of the foreign object by the sliding door 4 may be appropriately detected in response to the torque which is closer to the allowable torque.

The advance-angle value increase prohibition current value correction unit 51b of the advance-angle value setting unit 51 corrects the advance-angle value increase prohibition current value Imax so as to increase as the advance-angle value α increases. That is, the advance-angle value increase prohibition current value Imax is corrected so as to follow the catch detection threshold value Ith which is corrected so as to increase as the advance-angle value α increases. Accordingly, the advance-angle value increase prohibition unit 51a of the advance-angle value setting unit 51 may appropriately prohibit the increase setting of the advance-angle value α.

The embodiment may be modified as follows.

The predetermined value Δα of the change of the advance-angle value α when the advance-angle control is operated may change in response to the advance-angle value α.

In the embodiment, the correction value γ may gradually change in accordance with the value range of the present (current) advance-angle value α.

In the embodiment, the advance-angle value increase prohibition current value Imax may be fixed to a certain value, for example, the reference value Imax0, regardless of the advance-angle value α.

In the embodiment, the correction value β may gradually change in accordance with the value range of the current advance-angle value α.

According to the aforementioned embodiment, the sliding door 4 provided at the side surface 2s of the vehicle 1 corresponds to the power sliding door apparatus 30 serving as the opening and closing member. Alternatively, the opening and closing member may correspond to a backdoor provided at a rear of the vehicle, or a swing-type side door, as long as the detection of the catch of the foreign object in response to the current value Im is operated while the advance-angle control of the motor 20 serving as the drive source is operated. For example, the disclosure may be applied to a control apparatus for an opening and closing member for a vehicle which supports the opening and closing member other than a door, for example, a wind regulator descending and ascending a window glass or a sunroof apparatus.

According to the aforementioned embodiment, the control apparatus controlling the opening and closing member (4, 30) for the vehicle includes the drive control unit (25, 70) operating the opening and closing member of the vehicle (1) by the motor (20) serving as a drive source, and the catch detection unit (55) detecting the catch of the foreign object caught by the opening and closing member (4, 30) in response to a current value (Im) of the motor (20). The drive control unit (70) includes the motor control signal output unit (43) outputting a motor control signal (Smc) for supplying drive power to the motor (20), and the advance-angle value setting unit (51) setting the advance-angle value (α) for advancing the phase of the motor control signal (Smc). The advance-angle value setting unit (51) includes the advance-angle value increase prohibition unit (51a) prohibiting increase setting of the advance-angle value (α) in a case where the current value (Im) of the motor (20) reaches an advance-angle value increase prohibition current value (Imax).

According to the aforementioned configuration, in a case where the current value Im of the motor 20, the current value Im increasing in accordance with the increase of the advance-angle value α, reaches the advance-angle value increase prohibition current value Imax when the advance-angle control is operated, the advance-angle value increase prohibition unit 51a of the advance-angle value setting unit 51 prohibits the increase setting of the advance-angle value α. Accordingly, the advance-angle value α does not increase further, and the current value Im of the motor 20 does not increase to significantly exceed the advance-angle value increase prohibition current value Imax. Thus, the catch detection unit 55 is inhibited from detecting the catch of the foreign object mistakenly in response to or based on the current value Im of the motor 20.

According to the aforementioned embodiment, the catch detection unit (55) includes a catch detection threshold value correction unit (55a) detecting the catch of the foreign object caught by the opening and closing member (4, 30) in response to magnitude correlation between the current value (Im) of the motor (20) and the catch detection threshold value (Ith), the catch detection threshold value correction unit (55a) correcting the catch detection threshold value (Ith) to increase as the advance-angle value (α) increases. The advance-angle value setting unit (51) includes the advance-angle value increase prohibition current value correction unit (51b) correcting the advance-angle value increase prohibition current value (Imax) to increase as the advance-angle value (α) increases.

It is confirmed that, in a case where the allowable torque for detecting the catch of the foreign object by the sliding door 4 is the same, the current value Im of the motor 20 in response to the allowable torque increases as the advance-angle value α increases. According to the aforementioned configuration, the advance-angle value increase prohibition unit 51a corrects the catch detection threshold value Ith so as to increase as the advance-angle value α increases so that the catch of the foreign object by the sliding door 4 may be appropriately detected in response to the torque which is closer to the allowable torque.

The advance-angle value increase prohibition current value correction unit 51b of the advance-angle value setting unit 51 corrects the advance-angle value increase prohibition current value Imax so as to increase as the advance-angle value α increases. That is, the advance-angle value increase prohibition current value Imax is corrected so as to follow the catch detection threshold value Ith which is corrected so as to increase as the advance-angle value α increases. Accordingly, the advance-angle value increase prohibition unit 51a of the advance-angle value setting unit 51 may appropriately prohibit the increase setting of the advance-angle value α.

According to the invention, the misdetection of the catch of the foreign object maybe inhibited when the advance-angle control is operated.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A control apparatus controlling an opening and closing member for a vehicle, comprising:
   a drive control unit operating an opening and closing member of the vehicle by a motor serving as a drive source; and
   a catch detection unit detecting a catch of a foreign object caught by the opening and closing member in response to a current value of the motor; wherein
   the drive control unit includes
      a motor control signal output unit outputting a motor control signal for supplying a drive power to the motor, and
      an advance-angle value setting unit setting an advance-angle value for advancing a phase of the motor control signal; and
   the advance-angle value setting unit includes an advance-angle value increase prohibition unit prohibiting increase setting of the advance-angle value in a case where the current value of the motor reaches an advance-angle value increase prohibition current value.

2. The control apparatus controlling the opening and closing member for the vehicle according to claim 1, wherein
   the catch detection unit includes a catch detection threshold value correction unit detecting the catch of the foreign object caught by the opening and closing member in response to magnitude correlation between the current value of the motor and a catch detection threshold value, the catch detection threshold value correction unit correcting the catch detection threshold value to increase as the advance-angle value increases; and
   the advance-angle value setting unit includes an advance-angle value increase prohibition current value correction unit correcting the advance-angle value increase prohibition current value to increase as the advance-angle value increases.

* * * * *